US012718443B2

(12) United States Patent
Teshigawara

(10) Patent No.: US 12,718,443 B2
(45) Date of Patent: Aug. 25, 2026

(54) MEDICAL IMAGE PROCESSING DEVICE, MEDICAL IMAGE PROCESSING METHOD, AND NON-TRANSITORY COMPUTER-READABLE STORAGE MEDIUM

(71) Applicant: Canon Kabushiki Kaisha, Tokyo (JP)

(72) Inventor: Manabu Teshigawara, Otawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 17/985,246

(22) Filed: Nov. 11, 2022

(65) Prior Publication Data

US 2023/0147531 A1 May 11, 2023

(30) Foreign Application Priority Data

Nov. 11, 2021 (JP) ................................ 2021-183884

(51) Int. Cl.
*G06T 12/20* (2026.01)
*G06T 12/30* (2026.01)

(52) U.S. Cl.
CPC .............. *G06T 12/20* (2026.01); *G06T 12/30* (2026.01)

(58) Field of Classification Search
None
See application file for complete search history.

(56) References Cited

U.S. PATENT DOCUMENTS 5,502,303 A * 3/1996 Gonzalez-Lepera ... H01J 37/06 250/252.1
6,987,270 B2 1/2006 Trotter
2015/0065854 A1 * 3/2015 Ahn .................... A61B 6/5247 600/411
2015/0216486 A1 * 8/2015 Moriyasu ................ A61B 6/44 600/436

OTHER PUBLICATIONS

Ollinger, John M., and Jeffrey A. Fessler. "Positron-emission tomography." Ieee signal processing magazine 14.1 (2002): 43-55. (Year: 2002).*
Tong, Shan, Adam M. Alessio, and Paul E. Kinahan. "Image reconstruction for PET/CT scanners: past achievements and future challenges." Imaging in medicine 2.5 (2010): 529. (Year: 2010).*
Carter, Lukas M., et al. "The impact of positron range on PET resolution, evaluated with phantoms and PHITS Monte Carlo simulations for conventional and non-conventional radionuclides." Molecular imaging and biology 22.1 (2020): 73-84. (Year: 2020).*

(Continued)

*Primary Examiner* — Matthew C Bella
*Assistant Examiner* — Johnny B Duong
(74) *Attorney, Agent, or Firm* — Oblon, McClelland, Maier & Neustadt, L.L.P.

(57) ABSTRACT

A medical image processing device according to an embodiment includes a processing circuit. The processing circuit is configured: to obtain an electron density function of an examined subject and information about a nuclide administered for the examined subject; to calculate a positron range kernel related to the examined subject, on the basis of the electron density function and the nuclide; and to reconstruct a Positron Emission Tomography (PET) image of the examined subject, on the basis of the positron range kernel.

9 Claims, 5 Drawing Sheets

(56) References Cited

OTHER PUBLICATIONS

Japanese Office Action issued Apr. 16, 2025 in Japanese Patent Application No. 2021-183884, 4 pgs.
European Communication pursuant to Article 94(3) EPC issued Apr. 10, 2025, in corresponding European Patent Application No. 22 206 785.2, 4 pages.
Extended European Search Report issued Apr. 11, 2023, in corresponding European Patent Application No. 22206785.2, 7 pages.
Cal-Gonzalez Jacobo et al., “Tissue-Dependent and Spatially-Variant Positron Range Correction in 3D PET”, IEEE Transactions On Medical Imaging, vol. 34, No. 11, Nov. 2015, pp. 2394-2403, XP011588391.
Bertolli Ottavia et al., “PET iterative reconstruction incorporating an efficient positron range correction method”, Physica Medica 32, 2016, pp. 323-330, XP029460734.
Herraiz Joaquin L. et al., “Deep-Learning Based Positron Range Correction of PET Images”, Applied Science, 11, 266, 2021, pp. 1-13, XP093034970.
Office Action mailed Apr. 25, 2026, in Chinese Application No. 202211411049.7 filed Nov. 11, 2022 (w/English translation).

* cited by examiner

100
PET APPARATUS
31
GANTRY
102
FRONT END CIRCUIT
3
P
103
106
104
32
MEDICAL IMAGE PROCESSING DEVICE
110
INPUT DEVICE
120
DISPLAY
130
STORAGE
150
PROCESSING CIRCUIT
150a
OBTAINING FUNCTION
150b
CALCULATING FUNCTION
150c
RECONSTRUCTING FUNCTION
150d
CONTROLLING FUNCTION
150e
RECEIVING FUNCTION
150f
IMAGE GENER-ATING FUNCTION
150g
DISPLAY CONTROL-LING FUNCTION
150h
LEARNING FUNCTION

MEDICAL IMAGE PROCESSING DEVICE, MEDICAL IMAGE PROCESSING METHOD, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2021-183884, filed on Nov. 11, 2021; the entire contents of which are incorporated herein by reference.

FIELD

Embodiments described herein relate generally to a medical image processing device, a medical image processing method, and a non-transitory computer-readable storage medium.

BACKGROUND

A Positron Emission Tomography (PET) apparatus at present is configured to perform coincidence counting on gamma rays resulting from pair production at annihilation points in association with pair-annihilation between positrons emitted from a labelling drug and surrounding electrons, so as to generate a distribution of the annihilation points calculated on the basis of count data as an image.

In this situation, the annihilation points do not necessarily coincide with positron emission points indicating a distribution of the labeling drug used for observing a pathological state. Thus, an image indicating the distribution of the annihilation points is naturally different from an image indicating a distribution of the positron emission points. Nevertheless, with the labeling nucleus of F-18 primarily used in PET examinations, because the positron range is sufficiently short in water (average 0.44 mm), there are some situations where no big problem is caused in practice by considering the image indicating the distribution of the annihilation points to be the same as an image indicating the distribution of the positron emission points.

However, positron ranges of labeling nuclei other than F-18 are equal to or larger than pixel sizes. For example, average in-water positron ranges of Rb-82 used in heart PET examinations and Ga-68 used in immune PET are 5 mm or larger and 2.5 mm, respectively. Thus, images acquired by simply implementing a conventional reconstruction method may have lower visibility of lesions and degraded quantitativeness, because of blurring characteristics caused by the positron range.

DETAILED DESCRIPTION

A medical image processing device provided in one aspect of the present disclosure includes a processing circuit. The processing circuit is configured: to obtain an electron density function of an examined subject and information about a nuclide administered for the examined subject; to calculate a positron range kernel related to the examined subject, on the basis of the electron density function and the nuclide; and to reconstruct a PET image of the examined subject, on the basis of the positron range kernel.

Exemplary embodiments of a medical image processing device, a medical image processing method, and a program will be explained in detail below, with reference to the accompanying drawings.

Embodiments

Figure 1:
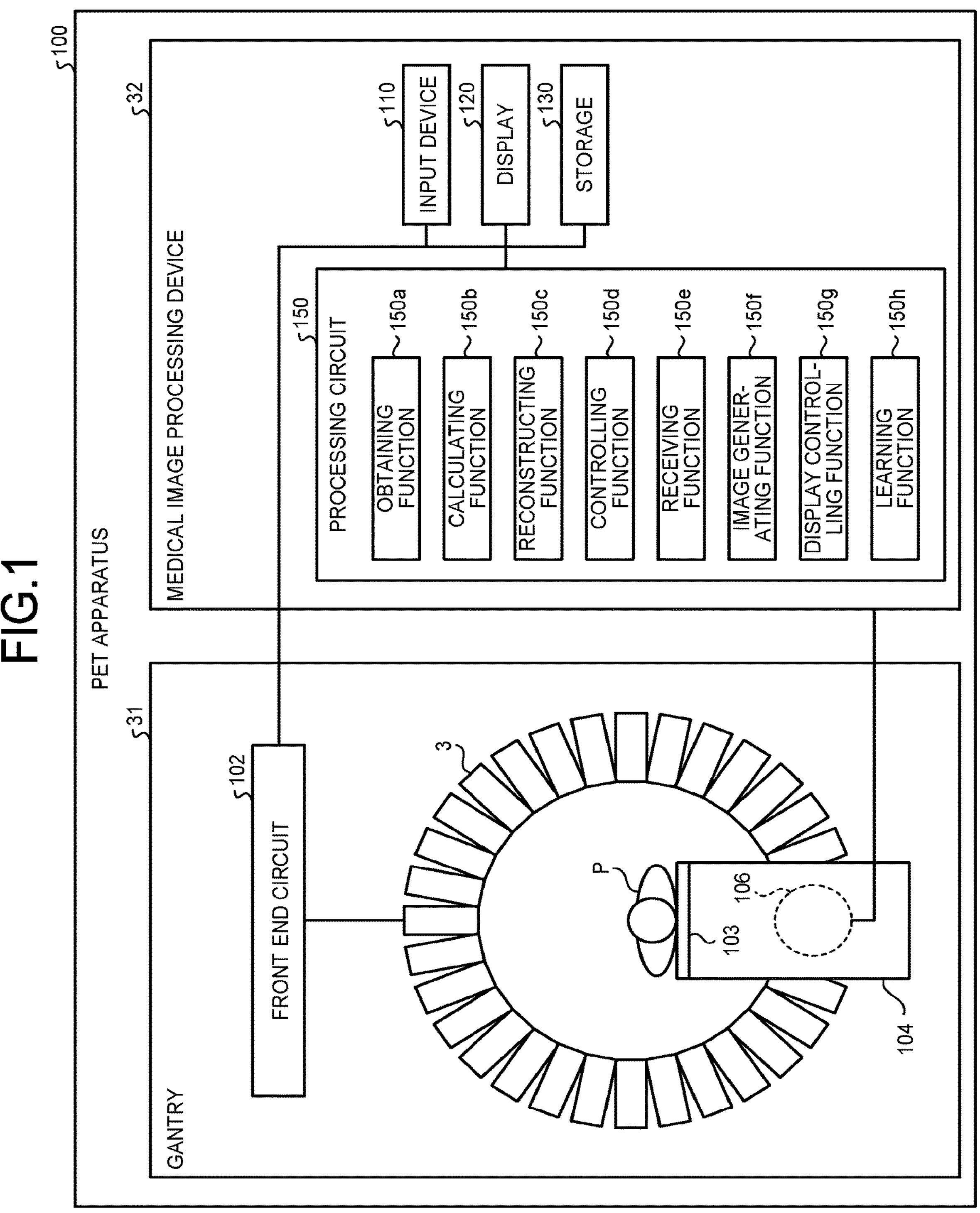
FIG. 1 is a diagram illustrating a PET apparatus according to an embodiment.

FIG. 1 is a diagram illustrating a configuration of a PET apparatus 100 serving as a medical image processing device according to the embodiment. As illustrated in FIG. 1, the PET apparatus 100 according to the embodiment includes: a gantry 31 and a medical image processing device 32 configured to also function as a console device. The gantry 31 includes detectors 3, a front end circuit 102, a tabletop 103, a table 104, and a table driving unit 106.

The detectors 3 are detectors configured to detect radiation, by detecting scintillation photons (fluorescent light) representing light that is re-released when a substance in an excited state transitions back into a ground state as a result of an interaction between annihilation gamma rays released from positrons in an imaged subject (hereinafter, "patient") P and light emitting bodies (scintillators). The detectors 3 are configured to detect radiation energy information of the annihilation gamma rays released from the positrons inside the patient P. The plurality of detectors 3 are arranged so as to surround the patient P in a ring formation, while forming a plurality of detector blocks, for example.

An example of a specific configuration of the detectors 3 may be detectors of an Anger type using a photon counting method and including, for example, scintillators, optical detecting elements, and a light guide. Other configuration examples include non-Anger type detectors in which scintillators and optical detecting elements have one-to-one optical coupling. In other words, each of the pixels included in the detectors 3 has a scintillator and an optical detecting element configured to detect generated scintillation photons.

The scintillators are configured to convert the annihilation gamma rays that have become incident thereto after being released from the positrons inside the patient P, into scintillation photons (or optical photons) and to output the scintillation photons. For example, the scintillators are formed with scintillator crystals such as those of Lutetium Yttrium Oxyorthosilicate (LYSO), Lutetium Oxyorthosilicate (LSO), Lutetium Gadolinium Oxyorthosilicate (LGSO), Bismuth Germanium Oxide (BGO), or the like and are arranged two-dimensionally, for example.

As the optical detecting elements, for example, Silicon Photomultipliers (SiPMs) or photomultiplier tubes may be used. The photomultiplier tubes include: a photocathode configured to receive the scintillation photons and to generate photoelectrons; multi-stage dynodes configured to provide an electric field for accelerating the generated photoelectrons; and an anode serving as an outlet through which electrons flow out. The photomultiplier tubes are configured to multiply the photoelectrons derived from the scintillation photons output from the scintillators and to convert the multiplied photoelectrons into electrical signals.

Further, by employing the front end circuit 102, the gantry 31 is configured to generate count information from output signals of the detectors 3 and to store the generated count information into a storage unit 130 of the medical image processing device 32. In this situation, the detectors 3 are divided into the plurality of blocks and are provided with the front end circuit 102.

The front end circuit 102 is configured to convert the output signals from the detectors 3 into digital data and to generate the count information. The count information includes detection positions of the annihilation gamma rays, energy values, and detection times. For example, the front end circuit 102 is configured to identify a plurality of optical detecting elements that converted scintillation photons into electrical signals at mutually the same time. Further, the front end circuit 102 is configured to identify scintillator numbers (P) indicating the positions of the scintillators to which the annihilation gamma rays became incident. As for a means for identifying the positions of the scintillators to which the annihilation gamma rays became incident, it is acceptable to identify the positions by performing a center-of-gravity calculation on the basis of the positions of the optical detecting elements and intensities of the electrical signals. Further, when the element sizes of the scintillators and the optical detecting elements correspond with each other, the scintillators corresponding to the optical detecting elements from which maximum outputs were obtained, for example, may be postulated as the positions of the scintillators to which the annihilation gamma rays became incident, so that the final scintillation positions are identified by further taking scattering among the scintillators into consideration.

Further, the front end circuit 102 is configured to identify energy values (E) of the annihilation gamma rays that became incident to the detectors 3, either by performing an integral calculation on the intensities of the electrical signals output from the optical detecting elements or by measuring a time ("Time over Threshold") at which the electrical signal intensities exceed a threshold value. Further, the front end circuit 102 is configured to identify detection times (T) at which the scintillation photons from the annihilation gamma rays are detected by the detectors 3. In this situation, the detection times (T) may be absolute times or elapsed time periods since the start of an imaging process. As explained herein, the front end circuit 102 is configured to generate the count information including the scintillator numbers (P), the energy values (E), and the detection times (T).

In this situation, the front end circuit 102 is realized by using, for example, a Central Processing Unit (CPU), a Graphical Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The front end circuit 102 is an example of a front end unit.

The tabletop 103 is a bed on which the patient P is placed and is arranged over the table 104. The table driving unit 106 is configured to move the tabletop 103 under control of a controlling function 150*d* of a processing circuit 150. For example, the table driving unit 106 is configured to move the patient P to the inside of an imaging opening of the gantry 31, by moving the tabletop 103.

Upon receipt of an operation performed by an operator on the PET apparatus 100, the medical image processing device 32 is configured to control imaging of a PET image and to reconstruct the PET image by using the count information acquired by the gantry 31. As illustrated in FIG. 1, the medical image processing device 32 includes the processing circuit 150, an input device 110, a display 120, and the storage unit 130. In this situation, functional units included in the medical image processing device 32 are connected together via a bus. Details of the processing circuit 150 will be explained later.

The input device 110 is a mouse, a keyboard, and/or the like used by the operator of the PET apparatus 100 for inputting various types of instructions and various types of settings and is configured to transfer the input various types of instructions and various types of settings to the processing circuit 150. For example, the input device 110 may be used for inputting an instruction to start an imaging process.

The display 120 is a monitor or the like referenced by the operator and is configured, under control of the processing circuit 150, to display a respiratory waveform and the PET image of the patient and to display a Graphical User Interface (GUI) used for receiving the various types of instructions and the various types of settings from the operator.

The storage unit 130 is configured to store therein various types of data used in the PET apparatus 100. For example, the storage unit 130 is configured by using a memory and may be, in an example, realized by using a semiconductor memory element such as a Random Access Memory (RAM) or a flash memory, or a hard disk, an optical disk, or the like. The storage unit 130 is configured to store therein: the count information which is the information in which the scintillator numbers (P), the energy values (E), and the detection times (T) are kept in correspondence with one another; coincidence information in which coincidence numbers serving as serial numbers of pieces of coincidence information are kept in correspondence with sets of count information; or projection data obtained by aggregating the coincidence information; as well as the reconstructed PET image, and/or the like.

The processing circuit 150 includes an obtaining function 150*a*, a calculating function 150*b*, a reconstructing function 150*c*, a controlling function 150*d*, a receiving function 150*e*, an image generating function 150*f*, a display controlling function 150*g*, and a learning function 150*h*.

In the embodiment, the processing functions implemented by the obtaining function 150*a*, the calculating function 150*b*, the reconstructing function 150*c*, the controlling function 150*d*, the receiving function 150*e*, the image generating function 150*f*, the display controlling function 150*g*, and the learning function 150*h* are stored in the storage unit 130 in the form of computer-executable programs. The processing circuit 150 is a processor configured to realize the functions corresponding to the programs by reading and executing the programs from the storage unit 130. In other words, the processing circuit 150 that has read the programs has the functions illustrated within the processing circuit 150 in FIG. 1.

Further, although the example is explained with reference to FIG. 1 in which the single processing circuit (i.e., the processing circuit 150) realizes the processing functions implemented by the obtaining function 150*a*, the calculating function 150*b*, the reconstructing function 150*c*, the controlling function 150*d*, the receiving function 150*e*, the image generating function 150*f*, the display controlling function 150*g*, and the learning function 150*h*, it is also acceptable to structure the processing circuit 150 by combining together a plurality of independent processors so that the functions are realized as a result of the processors executing the programs. In other words, each of the above-mentioned functions may be structured as a program, so that the single processing circuit (i.e., the processing circuit 150) executes the programs. In another example, one or more specific functions may be installed in a dedicated and independent program executing circuit.

The term "processor" used in the above explanations denotes, for example, a Central Processing Unit (CPU), a Graphical Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The one or more processors are configured to realize the functions by reading and executing the programs saved in the storage unit 130.

In FIG. 1, the obtaining function 150*a*, the calculating function 150*b*, the reconstructing function 150*c*, the controlling function 150*d*, the receiving function 150*e*, the image generating function 150*f*, the display controlling function 150*g*, and the learning function 150*h* are examples of an obtaining unit, a calculating unit, a reconstruction processing unit, a controlling unit, a receiving unit, an image generating unit, a display controlling unit, and a learning unit, respectively.

By employing the controlling function 150*d*, the processing circuit 150 is configured to control the entirety of the PET apparatus 100, by controlling the gantry 31 and the medical image processing device 32.

Further, by employing the controlling function 150*d*, the processing circuit 150 is configured to control the table driving unit 106. By employing the receiving function 150*e*, the processing circuit 150 is configured to receive various instructions from a user, via the input device 110 or the display 120. By employing the image generating function 150*f*, the processing circuit 150 is configured to generate various types of images on the basis of information obtained from the front end circuit 102. Further, by employing the display controlling function 150*g*, the processing circuit 150 is configured to cause the display 120 to display images reconstructed by the reconstructing function 150*c* and images generated by the image generating function 150*f*.

Details of the obtaining function 150*a*, the calculating function 150*b*, the reconstructing function 150*c*, and the learning function 150*h* will be explained later.

Next, a background of the embodiment will briefly be explained.

Figure 2:
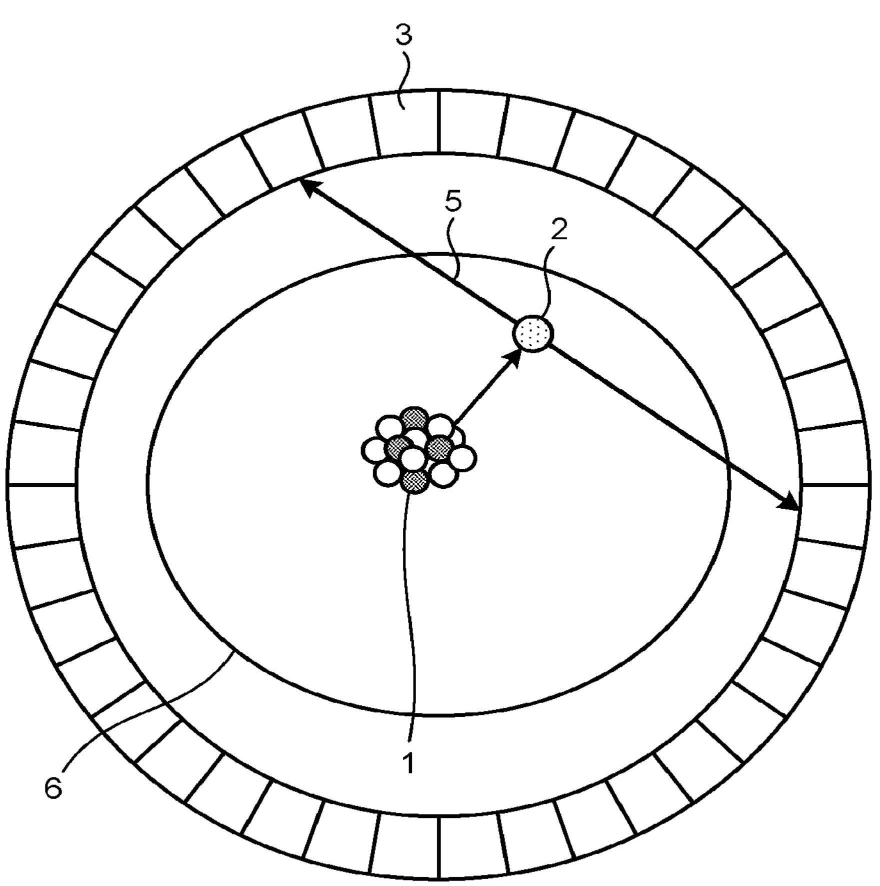
FIG. 2 is a drawing for explaining a background of the embodiment.

A PET apparatus at present is configured to perform coincidence counting on gamma rays resulting from pair production at annihilation points in association with annihilation between positrons emitted from a labelling drug and surrounding electrons, so as to reconstruct a distribution of the annihilation points calculated on the basis of count information as an image. For example, as illustrated in FIG. 2, a positron emitted at a positron emission point 1 annihilates with a surrounding electron at an annihilation point 2 substantially within a positron range 6, so that a pair of gamma rays are emitted. On the pair of gamma rays, the coincidence counting process is performed by the detectors 3. On the basis of coincidence information at the detectors 3, a Line Of Response (LOR) 5 of the gamma rays is estimated, so as to reconstruct a distribution of annihilation points 2 on the basis of the estimated LOR 5.

In this situation, the annihilation points 2 do not necessarily coincide with the positron emission points 1 indicating a distribution of the labeling drug used for observing a pathological state. Thus, an image indicating the distribution of the annihilation points 2 is naturally different from an image indicating a distribution of the positron emission points 1. Nevertheless, because the positron range 6 of the labeling nucleus of F-18, which is primarily used in PET examinations, is sufficiently short in water (average 0.44 mm) in comparison to a typical spatial resolution of PET apparatuses, there are some situations where no huge problem is caused in practice by considering the image indicating the distribution of the annihilation points 2 as an image indicating the distribution of the positron emission points 1.

However, positron ranges of labeling nuclei other than F-18 are equal to or larger than even pixel sizes. For example, average in-water positron ranges of Rb-82 used in heart PET examinations and Ga-68 used in immune PET are 5 mm or larger and 2.5 mm, respectively. Thus, images acquired by simply implementing a conventional reconstruction method may have lower visibility of lesions and degraded quantitativeness, because of blurring characteristics caused by the positron range.

For example, when an annihilation point image obtained by using, as a targeted nucleus, F-18 which is a nuclide having a relatively small positron range, is compared with an annihilation point image obtained by using, as a targeted nucleus, Ga-68 which is a nuclide having a relatively large positron range, because the positron range of F-18 is relatively small, blurring characteristics of the image due to the positron range are not so prominent. In contrast, with Ga-68, because the positron range of Ga-68 is relatively large, the annihilation point image would be blurred due to the positron range. Accordingly, it would be desirable to reconstruct a positron emission point image instead of the annihilation point image.

Incidentally, tracks, within a substance, of positrons emitted from a labeling nucleus and the shape of an annihilation point distribution that is statistically formed are dependent on kinetic energy of the emitted positrons and the shape of an electron density distribution in the surroundings of the emission points. In this regard, the shapes of electron density distributions in different parts of a living body such as an examined subject (hereinafter, "patient") are not necessarily uniform and may form a plane that exhibits drastic changes such as a tissue boundary. Accordingly, generally speaking, the annihilation point distributions corresponding to the positron emission points have local dependence and are anisotropic. As an example, with a lung tissue, for instance, the shapes of the electron density distributions are greatly different between a lung tissue part and an air part.

In those situations, it is known that artifacts may be caused when an attempt is made to correct the positron range by taking a simplified approach such as uniformly applying an isotropic deconvolution to all the points. It has therefore been considered desirable to take an approach reflecting the local dependence and the anisotropy of electron density distributions. However, because of complexity thereof, modeling has been considered difficult.

In view of the background as described above, the medical image processing device 32 according to the present embodiment includes the processing circuit 150. The processing circuit 150 in the present example is configured, by employing the obtaining function 150*a*, to obtain an electron density mathematical function (hereinafter, "electron density function") of a patient and information about a nuclide administered for the patient. By employing the calculating function 150_b_, the processing circuit 150 is configured to calculate a positron range kernel related to the patient on the basis of the electron density function and the nuclide. By employing the reconstructing function 150_c_, the processing circuit 150 is configured to reconstruct a PET image of the patient, on the basis of the positron range kernel.

More specifically, the processing circuit 150 is configured, while using the positron range kernel, to obtain a formula using a system matrix expressed as the product of the positron range kernel and a detection probability matrix. As a result, it is possible to correct effects of the positron range in the PET image. The image quality of an output image is therefore improved.

In particular, in the present formularization, by employing the calculating function 150_b_, the processing circuit 150 is able to calculate a positron range kernel with respect to each of a plurality of positions. As a result, even in the situation in reality where the electron density distribution has local dependence and is anisotropic, it is possible to properly express, in a model, impacts of positron ranges in the PET image reconstructions.

To begin with, an outline of a method according to the embodiment will be explained, with reference to FIG. 3 and Expressions (1) to (4) presented below.

At first, a relationship between the positron generation point 1 and the annihilation point 2 will be explained. Expression (1) presented below is true where $\rho_m$ denotes the quantity of pairs of annihilation gamma rays generated at an m-th voxel; and $\lambda_i$ denotes the quantity of the positrons emitted from an i-th voxel.

$$\rho_m = \sum_i T_{mi} \lambda_i \tag{1}$$

On the right-hand side of Expression (1), the matrix $T_{mi}$, which is an expansion coefficient, is referred to as a positron range kernel. As observed in Expression (1), the positron range kernel $T_{mi}$ is a value expressing a relationship between the quantity $\lambda_i$ of the positrons generated at the i-th voxel and the quantity $\rho_m$ of the pairs of annihilation gamma rays generated at the m-th voxel. In other words, by multiplying the quantity $\lambda_i$ of the positrons generated at the i-th voxel by the coefficient of the positron range kernel $T_{mi}$ 10 and further calculating a sum with respect to i, it is possible to obtain the quantity $\rho_m$ of the pair-annihilation gamma rays generated at the m-th voxel.

Next, Expression (2) presented below is true where $g_j$ denotes the quantity of the pairs of annihilation gamma rays detected at a j-th Line Of Response (LOR).

$$g_j = \sum_m H_{jm} \rho_m \tag{2}$$

On the right-hand side of Expression (2), the matrix $H_{jm}$, which is an expansion coefficient, is referred to as a detection probability matrix. As observed from Expression (2), the detection probability matrix $H_{jm}$ is a value expressing a relationship between the quantity $\rho_m$ of the pair-annihilation gamma rays generated at the m-th voxel and the quantity $g_j$ of the pairs of annihilation gamma rays detected at the j-th LOR. In other words, by multiplying the quantity $\rho_m$ of the pair-annihilation gamma rays generated at the m-th voxel by the coefficient of the detection probability matrix $H_{jm}$ 11 and further calculating a sum with respect to m, it is possible to obtain the quantity $g_j$ of the pairs of annihilation gamma rays detected at the j-th LOR.

Next, when Expression (1) is substituted into Expression (2), Expression (3) presented below is obtained.

$$g_j = \sum_m H_{jm} \rho_m = \sum_m H_{jm} \left( \sum_i T_{mi} \lambda_i \right) = \sum_i \left( \sum_m H_{jm} T_{mi} \right) \lambda_i = \sum_m H_{jm}^{PR} \lambda_i \tag{3}$$

It is possible to express the system matrix $H^{PR}$, which is a value on the right-hand side of Expression (3), by using Expression (4) presented below:

$$H_{ji}^{PR} = \sum_m H_{jm} T_{mi} \tag{4}$$

In other words, as indicated in Expression (4), the system matrix $H^{PR}$ is the product of the positron range kernel $T_{mi}$ and the detection probability matrix $H_{jm}$.

That is to say, when the positron range kernel $T_{mi}$ 10 is caused to act on the quantity $\lambda_i$ of the positrons generated at the i-th voxel, and further, the detection probability matrix $H_{jm}$ 11 is caused to act on the result thereof, the quantity $g_j$ of the pair of annihilation gamma rays detected at the j-th LOR is obtained. In this situation, these actions can also be regarded as causing the system matrix $H^{PR}_{ji}$ 12 to act on the quantity $\lambda_i$ of the positrons generated at the i-th voxel. In that situation, the system matrix $H^{PR}_{ji}$ 12 is the product of the positron range kernel $T_{mi}$ 10 and the detection probability matrix $H_{jm}$ 11.

Figure 4:
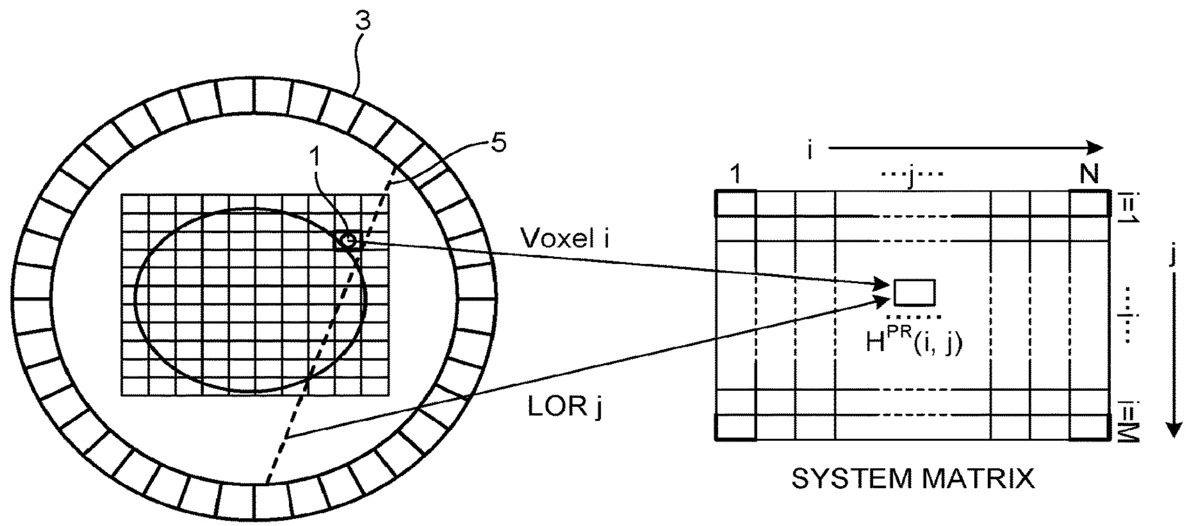
FIG. 4 is another drawing for explaining the process performed by the medical image processing device according to the embodiment.

FIG. 4 illustrates physical significance of the system matrix $H^{PR}_{ji}$ 12. More specifically, the component (j,i) in the system matrix $H^{PR}$ indicates a probability of annihilation gamma rays occurring from the positrons emitted from the i-th positron emission point 1 being detected at the j-th LOR 5. In this situation, when the quantity $g_j$ of the pairs of annihilation gamma rays detected at each of the LORs and the value of the system matrix $H^{PR}$ are known, it is possible to calculate the quantity of the positrons emitted at each voxel by using Expression (3).

Next, a specific flow in a process performed by the medical image processing device 32 according to the embodiment will be explained, with reference to FIG. 5.

In the following description, an example will be explained in which, in FIG. 5, after the processes at steps S100 and S200 are performed, the processes at steps S300 and S400 are performed; however, the order in which steps S100 and S200 and steps S300 and S400 are performed is not fixed. For example, it is also acceptable to perform the processes at steps S300 and S400 before performing the processes at steps S100 and S200. In other words, it is sufficient when the processes at steps S200 and S400 are completed at least before the process at step S500 is started.

To begin with, at step S100, by employing the obtaining function 150_a_, the processing circuit 150 obtains an electron density function of the patient and information about the nuclide administered for the patient. In an example, by employing the obtaining function 150_a_, the processing circuit 150 obtains an X-ray CT image of the patient and further obtains the electron density function of the patient on the basis of the X-ray CT image. For example, by employing the obtaining function 150_a_, the processing circuit 150 obtains the electron density function of the patient, on the basis of CT values of the X-ray CT image. However, possible embodiments are not limited to this example. For instance, by employing the obtaining function 150*a*, the processing circuit 150 may obtain a Magnetic Resonance Imaging (MRI) image of the patient, so as to obtain the electron density function of the patient on the basis of the obtained MRI image. Further, although the embodiment was explained with the example in which the PET apparatus 100 obtains the electron density function of the patient from an external CT or MRI apparatus, the embodiment is also applicable to a Positron Emission Tomography/Computed Tomography (PET-CT) apparatus or a Positron Emission Tomography/Magnetic Resonance Imaging (PET-MRI) apparatus. In that situation, it is possible to carry out PET imaging on the basis of a CT image or an MRI image captured or taken by a CT apparatus or an MRI apparatus included in the PET-CT apparatus or the PET-MRI apparatus.

After that, at step S200, by employing the calculating function 150*b*, the processing circuit 150 calculates the positron range kernel $T_{mi}$ related to the patient, on the basis of the electron density function and the nuclide obtained at step S100. The positron range kernel $T_{mi}$ is the matrix indicating a probability of the positrons generated at the voxel i serving as the one voxel annihilating at the voxel m serving as another voxel.

In this situation, by employing the calculating function 150*b*, the processing circuit 150 calculates a positron range kernel with respect to each of a plurality of positions (voxels or pixels). As a result, it is possible to properly express the locality and the anisotropy of the electron density distribution in the model.

According to a first method for calculating the positron range kernel related to the patient, by employing the calculating function 150*b*, the processing circuit 150 calculates the probability of the positrons emitted at the voxel i annihilating at the voxel m, on the basis of a physical calculation based on the electron density function and the nuclide obtained at step S100 and further calculates the positron range kernel related to the patient on the basis of the calculated probability. In an example, with respect to each nucleus of a drug administered for the patient, kinetic energy of positrons at the time of positron emission is known. Thus, in an example, by employing the calculating function 150*b*, while postulating that positrons are emitted into different directions with an initial momentum estimated from the kinetic energy of the positrons, the processing circuit 150 calculates the probability of the positrons annihilating in each of the different positions, on the basis of the electron density function obtained at step S100. In an example, by employing the calculating function 150*b*, the processing circuit 150 calculates a scattering cross-section area of the annihilation between the positrons and electrons. In another example, by employing the calculating function 150*b*, the processing circuit 150 calculates a positron range kernel by establishing a transport equation related to radiation. The first method has an advantageous characteristic where, for example, the method is simpler and the required calculation amount is smaller, in comparison to a second method and a third method.

Further, according to the second method for calculating the positron range kernel related to the patient, by employing the calculating function 150*b*, the processing circuit 150 may calculate a probability of the positrons emitted at the voxel i annihilating at the voxel m, on the basis of a Monte Carlo simulation based on the electron density function and the nuclide obtained at step S100, so as to further calculate the positron range kernel related to the patient on the basis of the calculated probability. The second method has an advantageous characteristic where it is possible to perform the calculation with a constant precision level even when, for example, scattering of multiple times or the like are included, in comparison to the first method.

Further, according to the third method for calculating the positron range kernel related to the patient, the positron range kernel related to the patient may be calculated through deep learning. In an example, by employing the learning function 150*h*, the processing circuit 150 may perform a learning process regarding a relationship between electron density functions and probability distributions of annihilation positions of generated positrons, so as to further calculate the positron range kernel, on the basis of a trained model that has been trained, by employing the calculating function 150*b*.

Figure 6:
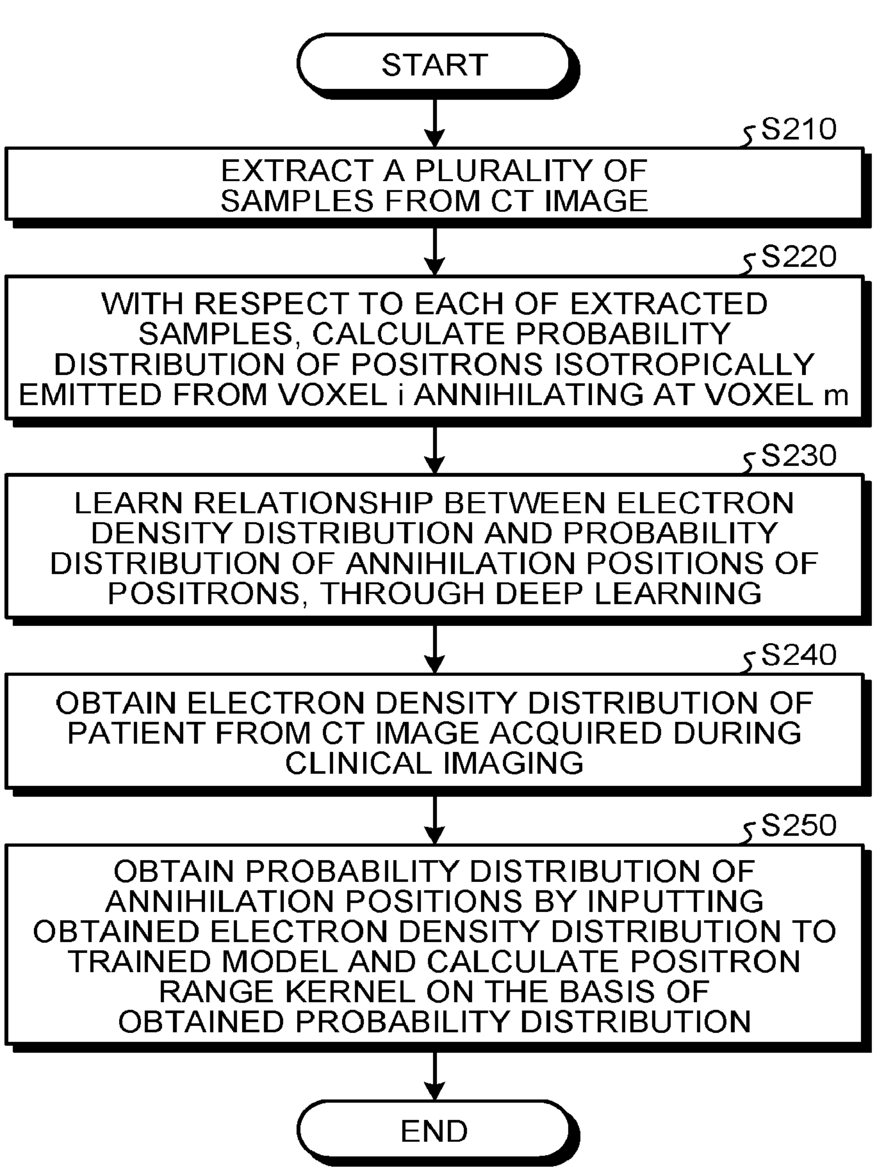
FIG. 6 is a flowchart for explaining an example of a procedure in the process performed at step S200 in FIG. 5.

An example of the process above is presented in FIG. 6. FIG. 6 is a flowchart for explaining a procedure in the process according to the third method for calculating the positron range kernel.

To begin with, at step S210, by employing the obtaining function 150*a*, the processing circuit 150 extracts and obtains a plurality of sample images which are represented by partial data cut out of one CT image or a plurality of CT images. As a result, by employing the obtaining function 150*a*, the processing circuit 150 has obtained a plurality of pieces of sample data of an electron density distribution.

Subsequently, at step S220, by employing the calculating function 150*b*, the processing circuit 150 calculates, with respect to each of the samples extracted at step S210, a probability distribution of the positrons isotropically emitted from the voxel i annihilating at the voxel m. In an example, by employing the calculating function 150*b*, the processing circuit 150 calculates the probability distribution of the positrons isotropically emitted from the voxel i annihilating at the voxel m, by performing a physical calculation or a Monte Carlo simulation. As a result, a plurality of pieces of training data are created in which the electron density distribution is kept in association with the probability distribution of the positions in which the positrons annihilate.

Subsequently, at step S230, by employing the learning function 150*h*, the processing circuit 150 inputs the plurality of pieces of training data which were generated at step S220 and in which the electron density distribution is kept in association with the probability distribution of the positions where the positrons annihilate, to a neural network such as a Convolutional Neural Network (CNN), so as to learn, through deep learning, the relationship between the electron density distributions and the probability distributions of the positions in which the positrons annihilate. In this manner, by employing the learning function 150*h* the processing circuit 150 has generated the trained model that has been trained about the relationship between the electron density functions and the probability distributions of the annihilation positions of the generated positrons.

In the embodiment, the processes at steps S210 through S230 do not necessarily have to be performed every time a clinical imaging process is performed. For example, the learning process at step S230 may be performed only once prior to a clinical imaging process, so that the generated trained model is implemented in common among a plurality of clinical imaging processes, for example.

After that, at step S240, by employing the obtaining function 150*a*, the processing circuit 150 obtains an electron density distribution of the patient. In an example, by employing the obtaining function 150*a*, the processing circuit 150 obtains the electron density distribution of the patient from a CT image acquired during a clinical imaging process. Subsequently, at step S250, by employing the calculating function 150*b*, the processing circuit 150 inputs the electron density distribution obtained at step S240 to the trained model generated at step S230, so as to obtain the probability distribution of the annihilation positions acquired as an output result and to further calculate a positron range kernel on the basis of the obtained probability distribution.

As explained above, according to the third method, by employing the calculating function 150*b*, the processing circuit 150 is configured to calculate the positron range kernel related to the patient, by using the deep learning. As explained earlier, the positron range kernel is anisotropic and has local dependence, and thus values thereof change depending on locations. Even in those situations, by cutting out a large number of pieces of sample data from CT images or the like and using the data in the learning process, the processing circuit 150 is able to calculate the positron range kernel having an excellent level of precision while employing the calculating function 150*b*, even with respect to the electron density distribution in reality that is anisotropic and has local dependence.

Figure 5:
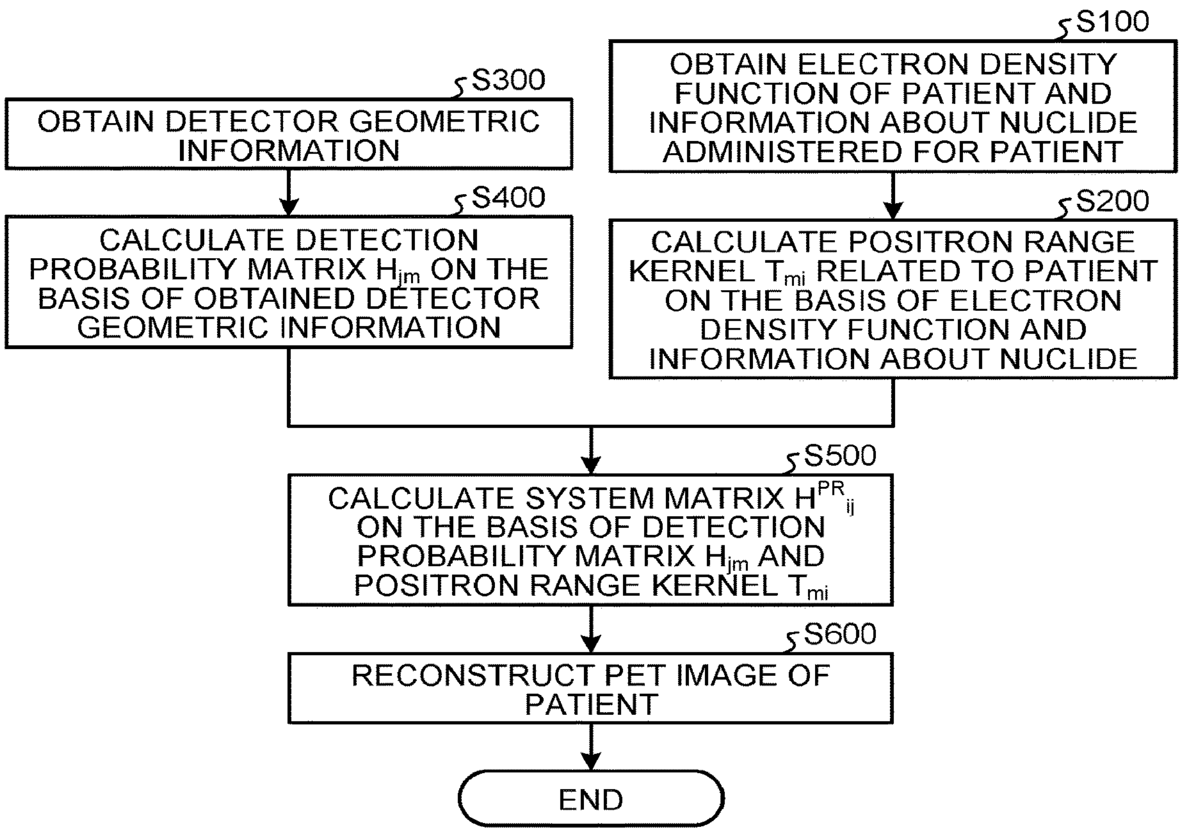
FIG. 5 is a flowchart for explaining a procedure in the process performed by the medical image processing device according to the embodiment.

Returning to the description of FIG. 5, at step S200, by employing the calculating function 150*b*, the processing circuit 150 calculates, in the manner described above, the positron range kernel related to the patient by using any of the first to the third methods, for example, on the basis of the electron density function and the information about the nuclide.

Further, at step S300, by employing the obtaining function 150*a*, the processing circuit 150 obtains detector geometric information, which is information indicating the position of each of the detectors. Subsequently, at step S400, by employing the calculating function 150*b*, the processing circuit 150 calculates a detection probability matrix $H_{jm}$ 11 indicated on the right-hand side of Expression (2) and in FIG. 3, on the basis of the detector geometric information obtained at step S300. The detection probability matrix $H_{jm}$ 11 is the matrix indicating the probability of the pair of gamma rays 2 generated in association with the positrons that annihilated at the one voxel m being detected by a pair of detectors related to the j-th LOR serving as the one LOR 5.

Figure 3:
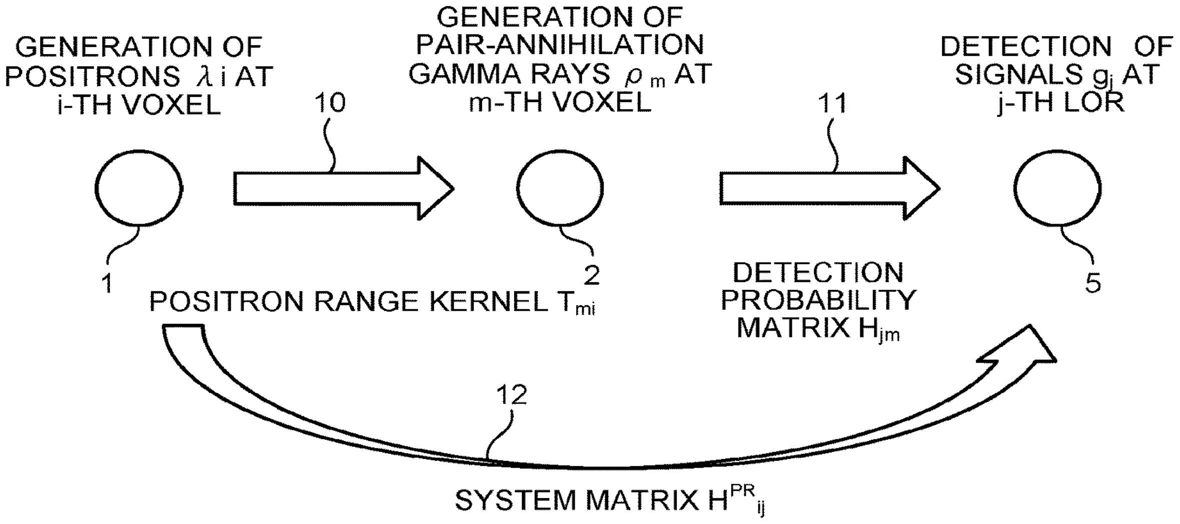
FIG. 3 is a drawing for explaining a process performed by a medical image processing device according to the embodiment.

After that, when the process at step S200 and the process at step S400 are completed, the processing circuit 150 calculates, by employing the calculating function 150*b* at step S500, the system matrix $H^{PR}$ 12 indicated on the left-hand side of Expression (4) and in FIG. 3, on the basis of the positron range kernel T 10 calculated at step S200 and the detection probability matrix H 11 calculated at step S300. More specifically, as indicated in Expression (4), by employing the calculating function 150*b*, the processing circuit 150 calculates the system matrix $H^{PR}$ 12 by calculating the product of the positron range kernel T 10 calculated at step S200 and the detection probability matrix H 11 calculated at step S300. The system matrix $H^{PR}_{ji}$ is a matrix indicating the probability of the gamma rays generated from the annihilations of the positrons generated at the voxel i serving as the one voxel being detected by the pair of detectors related to the j-th LOR serving as the one LOR.

Subsequently, at step S600, by employing the reconstructing function 150*c*, the processing circuit 150 reconstructs a PET image of the patient, on the basis of the system matrix $H^{PR}$ 12 calculated at step S500. More specifically, by employing the reconstructing function 150*c*, the processing circuit 150 reconstructs a positron emission point image, by reconstructing the quantity $\lambda_i$ of the emitted positrons with respect to each of the voxels, on the basis of the coefficient information $g_j$ with respect to each LOR indicated on the left-hand side of Expression (2), on the basis of the system matrix $H^{PR}$ 12 calculated at step S500.

In this situation, in the embodiment, the positron emission point image is reconstructed in a different manner from the method for reconstructing the quantity $\rho_m$ of the pairs of annihilation gamma rays generated with respect to each voxel indicated on the right-hand side of Expression (2), on the basis of the coefficient information $g_j$ and the detection probability matrix H 11 with respect to each LOR indicated on the left-hand side of Expression (2). Consequently, it is possible to generate an image from which the impacts of the blurring characteristics caused by the positron range are eliminated. It is therefore possible to improve the image quality.

In this situation, as for a specific image reconstruction method, the processing circuit 150 may perform the reconstruction by using Expression (5) presented below, for example, while employing the reconstructing function 150*c*.

$$\lambda_i^{k+1} = \frac{\lambda_i^k}{\sum_j H_{ji}^{PR}} \sum_j H_{ji}^{PR} \frac{g_j}{\sum_m H_{jm}^{PR} \lambda_m^k} \tag{5}$$

In Expression (5), $\lambda_i k$ is an estimated value of the quantity $\lambda_i$ of the positrons generated at the i-th voxel at a k-th iteration step. To begin with, by employing the reconstructing function 150*c*, the processing circuit 150 provides an initial value $\lambda_i^0$ of the quantity of the positrons generated at the i-th voxel by using a predetermined method. In an example, by employing the reconstructing function 150*c*, the processing circuit 150 provides the quantity of the annihilating gamma rays at the i-th voxel as the initial value $\lambda_i^0$ of the quantity of the positrons generated at the i-th voxel, by postulating that the positron emission points are equal to the gamma ray annihilation points. After that, by employing the reconstructing function 150*c*, the processing circuit 150 evaluates the right-hand side of Expression (5) and substitutes the left-hand side therewith, so as to calculate an estimated value $\lambda_i^{k+1}$ of the quantity of the positrons generated at the i-th voxel at a (k+1)-th iteration step, on the basis of the estimated value $\lambda_i^k$ of the quantity of the positrons generated at the i-th voxel at the k-th iteration step. By employing the reconstructing function 150*c*, the processing circuit 150 ends the process at the point in time when the estimated value has sufficiently converged and further calculates the estimated value at that point in time as the quantity of the positrons generated at the i-th voxel, so as to generate a positron emission point image.

In this situation, Expression (5) presented above indicates an example of the reconstruction process performed by the processing circuit 150 at step S600. However, possible methods for performing the reconstruction process implemented by the processing circuit 150 have many variations other than the abovementioned reconstruction method. In an example, in Expression (5), the processing circuit 150 may use an expression that takes a scattered ray correction into consideration, for example.

As explained above, the medical image processing device according to the embodiment is able to correct the effects of the positron range in the PET image through the formularization using the positron range kernel. As a result, the image quality of output images is improved.

In an example, with the present formularization, by employing the calculating function 150*b*, the processing circuit 150 is able to calculate the positron range kernel, with respect to each of a plurality of positions. As a result, even in the situation with clinical images in reality where the electron density distribution has local dependence and is anisotropic, it is possible to properly express, in the model, the impacts of the positron ranges on the PET image reconstruction.

According to at least one aspect of the embodiments described above, it is possible to improve the image quality.

In relation to the embodiments described above, the following notes are presented as certain aspects and selective characteristics of the present disclosure.

Note 1:

A medical image processing device provided in one aspect of the present disclosure includes an obtaining unit, a calculating unit, and a reconstruction processing unit. The obtaining unit is configured to obtain an electron density function of an examined subject and information about a nuclide administered for the examined subject. The calculating unit is configured to calculate a positron range kernel related to the examined subject, on the basis of the electron density function and the nuclide. The reconstruction processing unit is configured to reconstruct a PET image of the examined subject, on the basis of the positron range kernel.

Note 2:

The calculating unit may be configured to calculate the positron range kernel with respect to each of a plurality of positions.

Note 3:

The positron range kernel may be anisotropic.

Note 4:

The calculating unit may be configured to calculate a detection probability matrix on the basis of detector geometric information;

the calculating unit may be configured to calculate a system matrix on the basis of the detection probability matrix and the positron range kernel; and the reconstruction processing unit may be configured to reconstruct the PET image of the examined subject on the basis of the system matrix.

Note 5:

The positron range kernel may be a matrix indicating a probability of positrons generated at one voxel annihilating at another voxel, the detection probability matrix may be a matrix indicating a probability of gamma rays generated in association with the positrons that annihilated at the another voxel being detected by a pair of detectors related to one Line Of Response (LOR), and the system matrix may be a matrix indicating a probability of gamma rays generated from the annihilation of the positrons generated at the one voxel being detected by the pair of detectors related to the one LOR.

Note 6:

The calculating unit may be configured to calculate the positron range kernel on the basis of a physical calculation.

Note 7:

The calculating unit may be configured to calculate the positron range kernel on the basis of a Monte Carlo simulation.

Note 8:

The calculating unit may be configured to calculate the positron range kernel, on the basis of a trained model trained about a relationship between electron density functions and probability distributions of annihilation positions of generated positrons.

Note 9:

The obtaining unit may be configured to obtain the electron density function on the basis of an X-ray CT image or an MRI image of the examined subject.

Note 10:

A medical image processing method provided in one aspect of the present disclosure includes:

obtaining an electron density function of an examined subject and information about a nuclide administered for the examined subject;

calculating a positron range kernel related to the examined subject, on the basis of the electron density function and the nuclide; and reconstructing a PET image of the examined subject, on the basis of the positron range kernel.

Note 11:

A program provided in one aspect of the present disclosure is configured to cause a computer to perform:

obtaining an electron density function of an examined subject and information about a nuclide administered for the examined subject; calculating a positron range kernel related to the examined subject, on the basis of the electron density function and the nuclide; and reconstructing a PET image of the examined subject, on the basis of the positron range kernel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing device comprising a processing circuit configured to:

obtain an electron density function of an examined subject and information about a nuclide administered for the examined subject;

calculate a positron range kernel related to the examined subject, on a basis of the electron density function and the nuclide, the positron range kernel being an expansion coefficient matrix when expanding a quantity of pairs of annihilation gamma rays generated at a voxel with respect to a quantity of positrons generated at a voxel;

reconstruct a Positron Emission Tomography (PET) image of the examined subject, on a basis of the positron range kernel;

calculate a detection probability matrix on a basis of detector geometric information;

calculate a system matrix by calculating a product of the detection probability matrix and the positron range kernel; and reconstruct the PET image of the examined subject on a basis of the system matrix, wherein the quantity of pairs of annihilation gamma rays is $$\rho_m = \sum_i T_{mi}\lambda_i,$$

wherein $\rho_m$ is the quantity of the pairs of annihilation gamma rays generated, $T_{mi}$ is the positron range kernel, and $\lambda_i$ is the quantity of the positrons generated.

2. The medical image processing device according to claim 1, wherein the processing circuit is further configured to calculate the positron range kernel with respect to each of a plurality of positions.

3. The medical image processing device according to claim 1, wherein the positron range kernel is a matrix indicating a probability of positrons generated at one voxel annihilating at another voxel, the detection probability matrix is a matrix indicating a probability of a pair of gamma rays being detected by a pair of detectors related to one Line Of Response (LOR), the pair of gamma rays being generated in association with the positrons that annihilated at the another voxel, and the system matrix is a matrix indicating a probability of gamma rays being detected by the pair of detectors related to the one LOR, the gamma rays being generated from the annihilation of the positrons generated at the one voxel.

4. The medical image processing device according to claim 1, wherein the processing circuit is further configured to calculate the positron range kernel on a basis of a physical calculation.

5. The medical image processing device according to claim 1, wherein the processing circuit is further configured to calculate the positron range kernel on a basis of a Monte Carlo simulation.

6. The medical image processing device according to claim 1, wherein the processing circuit is further configured to calculate the positron range kernel, on a basis of a trained model trained about a relationship between electron density functions and probability distributions of annihilation positions of generated positrons.

7. The medical image processing device according to claim 1, wherein the processing circuit is further configured to obtain the electron density function on a basis of an X-ray CT image of the examined subject.

8. A medical image processing method comprising:

obtaining an electron density function of an examined subject and information about a nuclide administered for the examined subject;

calculating a positron range kernel related to the examined subject, on a basis of the electron density function and the nuclide, the positron range kernel being an expansion coefficient matrix when expanding a quantity of pairs of annihilation gamma rays generated at a voxel with respect to a quantity of positrons generated at a voxel;

reconstructing a Positron Emission Tomography (PET) image of the examined subject, on a basis of the positron range kernel;

calculating a detection probability matrix on a basis of detector geometric information;

calculating a system matrix by calculating a product of the detection probability matrix and the positron range kernel; and reconstructing the PET image of the examined subject on a basis of the system matrix, wherein the quantity of pairs of annihilation gamma rays is $$\rho_m = \sum_i T_{mi}\lambda_i,$$

wherein $\rho_m$ is the quantity of the pairs of annihilation gamma rays generated, $T_{mi}$ is the positron range kernel, and $\lambda_i$ is the quantity of the positrons generated.

9. A non-transitory computer-readable storage medium storing instructions that, when executed by one or more processors of a computer, cause the computer to:

obtain an electron density function of an examined subject and information about a nuclide administered for the examined subject;

calculate a positron range kernel related to the examined subject, on a basis of the electron density function and the nuclide, the positron range kernel being an expansion coefficient matrix when expanding a quantity of pairs of annihilation gamma rays generated at a voxel with respect to a quantity of positrons generated at a voxel;

reconstruct a Positron Emission Tomography (PET) image of the examined subject, on a basis of the positron range kernel;

calculate a detection probability matrix on a basis of detector geometric information;

calculate a system matrix by calculating a product of the detection probability matrix and the positron range kernel; and reconstruct the PET image of the examined subject on a basis of the system matrix, wherein the quantity of pairs of annihilation gamma rays is $$\rho_m = \sum_i T_{mi}\lambda_i,$$

wherein $\rho_m$ is the quantity of the pairs of annihilation gamma rays generated, $T_{mi}$ is the positron range kernel, and $\lambda_i$ is the quantity of the positrons generated.

* * * * *